Aug. 13, 1940.	L. S. WILLIAMS	2,211,189
INDICATING DEVICE
Filed Sept. 24, 1937	2 Sheets-Sheet 1
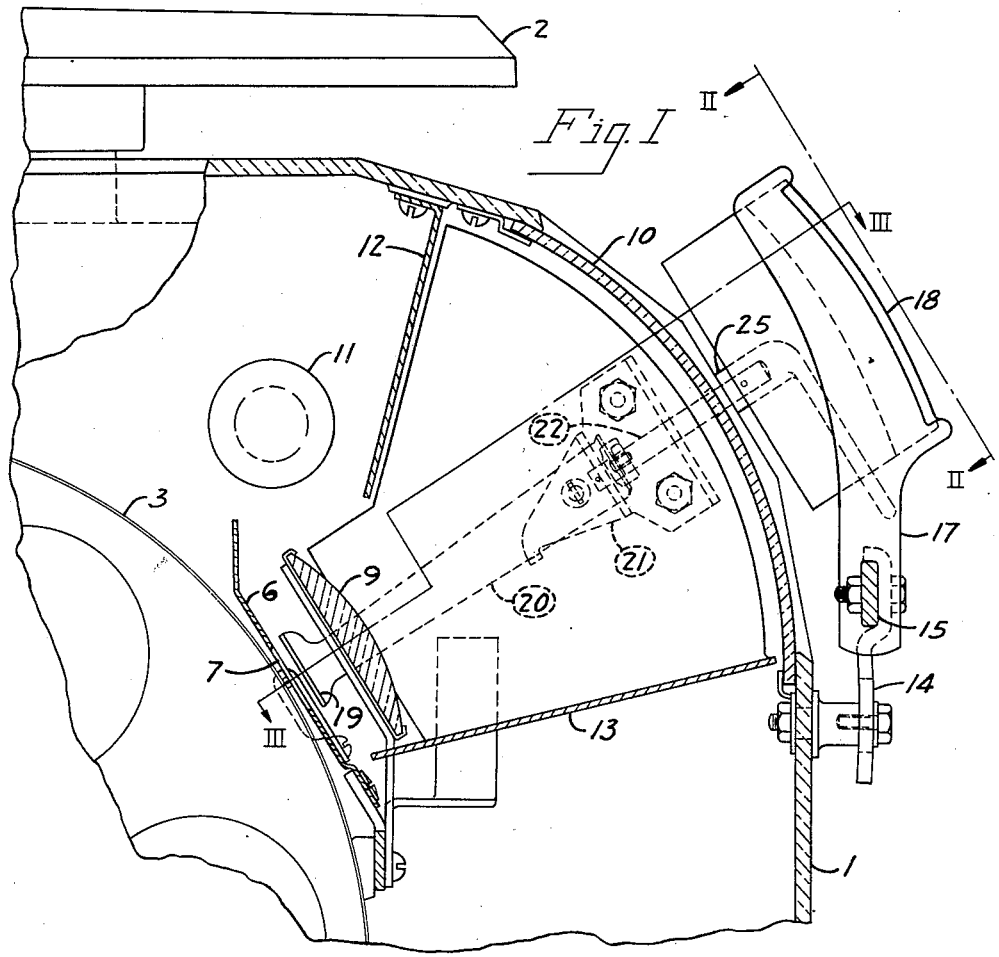
Fig. I
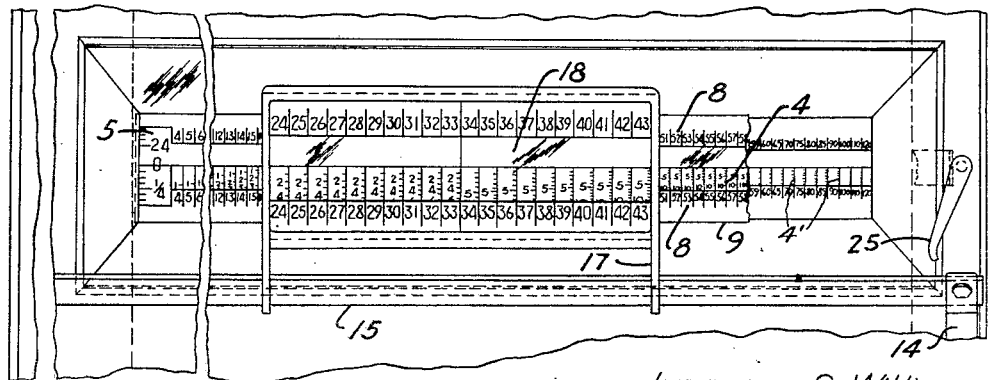
Fig. II
Lawrence S. Williams
INVENTOR
BY Marshall & Marshall
ATTORNEYS Aug. 13, 1940.  L. S. WILLIAMS  2,211,189
INDICATING DEVICE
Filed Sept. 24, 1937   2 Sheets-Sheet 2
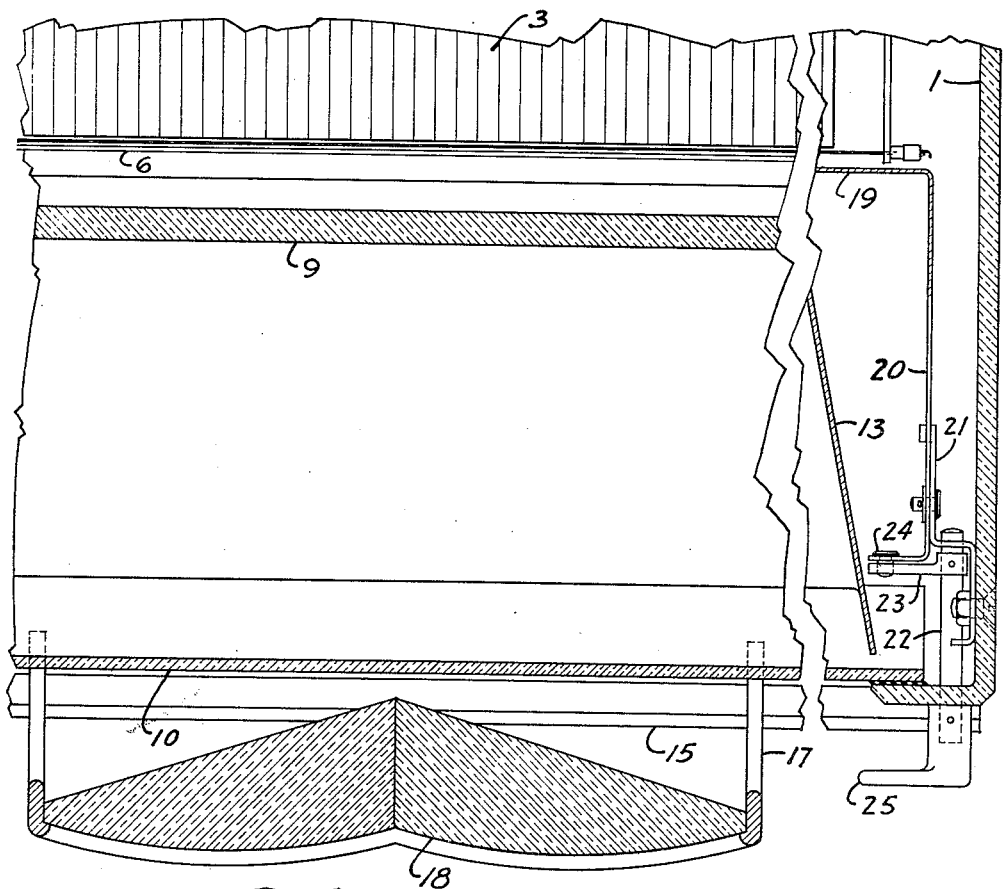
Fig. III.
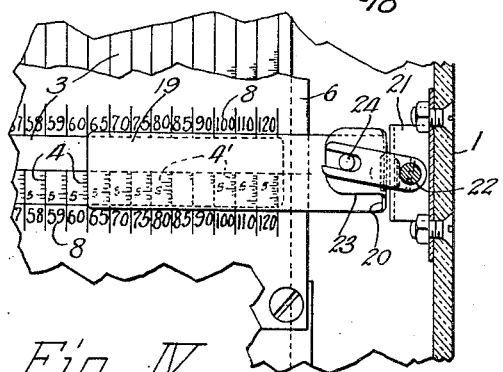
Fig. IV.
Lawrence S. Williams
INVENTOR
BY Marshall & Marshall
ATTORNEYS Patented Aug. 13, 1940

2,211,189

UNITED STATES PATENT OFFICE 2,211,189

INDICATING DEVICE

Lawrence S. Williams, Toledo, Ohio, assignor to Toledo Scale Company, Toledo, Ohio, a corporation of New Jersey Application September 24, 1937, Serial No. 165,543

3 Claims. (Cl. 88—1)

This invention relates to devices for indicating computed values. Certain types of computing weighing scales are equipped with charts upon which are printed columns of figures and graduation marks representing values computed at various prices per unit of weight. An ideal chart would have readable figures representing every possible weight multiplied by every possible price, but, since charts must be kept within usable dimensions, the number of computed values that can be represented by readable figures is limited. This invention belongs to the class of devices in which the number of computed value figures is increased by making the figures too small to be read easily unless magnified, and providing a magnifying reading device.

One of the objects of this invention is to provide means whereby a great number of magnified computed value indicia are visible to the operator at the same time.

Another object is to provide a magnifying viewing device through which a wide expanse of magnified but not greatly distorted indicia is visible.

Another object is the provision of an improved wide-angle spherical lens for magnifying indicia.

Another object is the provision of the combination of an improved wide-angle spherical lens with an elongated cylinder lens for magnifying indicia.

Still another object is the provision of a shiftable magnifying lens combined with a shutter for rendering certain indicia invisible except when the lens is in position to magnify such indicia.

Other objects and advantages will be apparent from the following description, in which reference is had to the accompanying drawings illustrating a preferred embodiment of my invention and wherein similar reference numerals designate similar parts throughout the several views.

In the drawings:

Figure I is a fragmentary elevational sectional view illustrating an indicating device embodying my invention;

Figure II is a view taken along the line II—II of Figure I, parts being broken away; and Figure III is a sectional view taken along the line III—III of Figure I, parts being broken away.

Figure IV is a fragmentary front elevational view showing structural details of a shutter mechanism forming a part of my invention, parts being in section.

Referring to the drawings in detail, the invention is shown as incorporated in a weighing scale having a casing 1, above which lies a commodity-receiving platter 2. The platter 2 is supported by weighing mechanism (not shown), the weighing mechanism being connected to a cylindrical chart 3 which revolves to positions corresponding to the weights of commodities on the platter 2.

The weighing mechanism may be of the type illustrated and described in U. S. Patent No. 2,066,624 issued Jan. 5, 1937, to Halvor W. Hem, or it may be of any other preferred type.

The chart 3 is provided with circumferential columns of value figures and graduations 4 and 4' and with a column of weight figures and graduations 5. Lying in front of the rotatable chart 3 is a fixed chart 6 having an elongated opening 7 through which the figures and graduations 4 and 4' and 5 are visible, and printed upon the chart 6, above and below the elongated opening 7, are identical series of price figures 8. Mounted in front of the stationary price chart 6 is an elongated cylindrical lens 9 which serves to magnify the up and down dimensions of the indicia on the charts 3 and 6.

The casing 1 is provided with a curved glass window 10 through which the indicia magnified by the lens 9 are visible. The indicia are illuminated by an electric lamp 11, and a shield 12 fixed within the casing 1 prevents light from passing directly from the lamp 11 to the window 10. Another shield 13 conceals the weighing mechanism.

Supported by brackets 14, fixed to the outside of the casing 1, is a rail 15 upon which is slidably mounted a frame 17 carrying a composite lens 18.

The lens 18 consists of two sections, the rear surfaces of which are flat and are arranged at an obtuse angle to each other, as shown in Figure III, the lens sections being thicker at their junction than at their extreme edges. The front surfaces of the lens sections are spherical; they are of the same curvature and are joined together along a curved line, and are tangent to a plane lying substantially perpendicular to the line of sight of a person observing the indicia on the charts 3 and 6. Because of the shape of the composite lens 18, an observer in reading position can see a wide expanse of chart surface, and the magnified figures thus visible are not much distorted. For this reason it is not necessary to shift the lens to new positions along the rail 15 as frequently as was the case with lenses as heretofore constructed. The effect of dividing the front surface of the lens into two convex portions and the rear surface into two flat portions meeting at an obtuse angle is to widen the undistorted field in the direction in which it is most useful in devices of this kind.

In some jurisdictions, weights and measures regulations require that value graduations must, whenever they are visible, appear to be certain minimum distances apart. It will be observed by inspection of Figures II and IV that at the higher prices per pound, viz., the prices per pound above 60 cents, the value graduations designated by the reference numeral 4' are closely crowded together. At these higher prices per pound the actual distances between the value graduations may be less than that required by such weights and measures regulations though the apparent distances when viewed through the magnifying lens 18 may be ample. In order to prevent the graduations 4' at the higher prices per pound from being visible when the magnifying lens 18 is shifted away from them, I have provided a shutter 19 which automatically covers the graduations 4' at the higher prices per pound when the lens 18 is shifted away from them and automatically uncovers them when the lens 18 is positioned in front of them.

The shutter 19 is fixed to an arm 20 which is pivoted upon a bracket 21 secured within the casing 1. Also journaled in the bracket 21 is a rockshaft 22, and fixed to the rockshaft 22 is an arm 23 which is provided with a slot that receives a pin 24 fixed to an extension on the arm 20. Also fixed to the rockshaft 22 is a cam 25 which is engaged by the frame 17 when the lens 18 is moved to a position in front of the indicia 4' representing values at the higher prices per pound. Engagement of the frame 17 with the cam 25 rocks the rockshaft 22 and swings the arm 20 to lift the shutter 19 away from in front of the indicia 4', and when the lens 18 is moved to the left, the arm 17 is disengaged from the cam 25 and the shutter drops in front of the indicia 4'.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, a chart supported by said frame and bearing series of indicia representing value computations, an elongated cylinder lens supported by said frame and lying in front of and magnifying said indicia in one dimension, a composite lens consisting of two plano-spherical sections lying in front of said elongated cylinder lens and magnifying said indicia in all dimensions, the indicia borne by said chart being visible through both said lenses and thereby magnified in great degree in one dimension and magnified in lesser degree in other dimensions, and means supported by said frame and shiftably supporting said composite lens so that said composite lens may be moved to selected positions longitudinally of said cylinder lens, the sections of said composite lens having flat surfaces meeting at an obtuse exterior angle to cause light reflected from said chart through said cylinder lens to be refracted laterally in divergent directions and thereby render indicia visible from divergent positions through said composite lens and said cylinder lens, said composite lens having spherical surfaces meeting along a curved line, said spherical surfaces being tangent to a common plane.

2. In a device of the class described, in combination, a frame, a chart supported by said frame and bearing series of indicia representing value computations, an elongated cylinder lens supported by said frame and lying in front of and magnifying said indicia in one dimension, a composite lens consisting of two plano-spherical sections lying in front of said elongated cylinder lens and magnifying said indicia in all dimensions, the indicia borne by said chart being visible through both said lenses and thereby magnified in great degree in one dimension and magnified in lesser degree in other dimensions, and means supported by said frame and shiftably supporting said composite lens so that said composite lens may be shifted longitudinally of said cylinder lens, said composite lens consisting of two sections having flat surfaces meeting at an obtuse exterior angle to cause light reflected from said chart through said cylinder lens to be refracted laterally in divergent directions and thereby render magnified indicia on said chart visible from divergent positions through said composite lens and said cylinder lens.

3. In a device of the class described, in combination, a frame, a chart supported by said frame and bearing indicia representing computed values, and a viewing device supported by said frame and through which said chart is visible, said viewing device including a composite lens composed of two plano-spherical sections, said sections each having a flat surface, the flat surfaces of said sections meeting at an obtuse exterior angle to cause light reflected from said chart to be prismatically refracted laterally in divergent directions and thereby cause indicia borne by said chart and magnified by said composite lens to be visible from divergent positions said sections each having a spherical surface, the spherical surfaces of said sections meeting along a curved line and the spherical surfaces of said sections being tangent to a common plane.

LAWRENCE S. WILLIAMS.